(No Model.)

T. & C. E. DAVIS.

APPARATUS FOR UTILIZING WASTE HEAT IN AMMONIA REFRIGERATING APPARATUS.

No. 256,650. Patented Apr. 18, 1882.

WITNESSES:
H. P. Hood.
Ozni P. Hood

INVENTORS:
Thomas Dawes
Chas. E. Davis

UNITED STATES PATENT OFFICE.

THOMAS DAVIS AND CHARLES E. DAVIS, OF INDIANAPOLIS, INDIANA.

APPARATUS FOR UTILIZING WASTE HEAT IN AMMONIA REFRIGERATING APPARATUS.

SPECIFICATION forming part of Letters Patent No. 256,650, dated April 18, 1882.

Application filed March 17, 1882. (No model.)

*To all whom it may concern:*

Be it known that we, THOMAS DAVIS and CHARLES E. DAVIS, residents of Indianapolis, in the county of Marion and State of Indiana, have invented a new and Useful Apparatus for Utilizing Waste Heat in Ammonia Refrigerating Apparatus, of which the following is a specification, having reference to the accompanying drawings.

Our invention has for its object the utilization as power for driving machinery of the heat absorbed by the gaseous ammonia while circulating in the refrigerator of an ammonia refrigerating apparatus.

Our invention consists in combining with an ammonia refrigerating apparatus a motor so arranged in relation thereto that the gaseous ammonia while on its way from the refrigerator to the absorber passes through and drives said motor, as hereinafter fully explained.

The accompanying drawings illustrate our invention.

Figure 1:
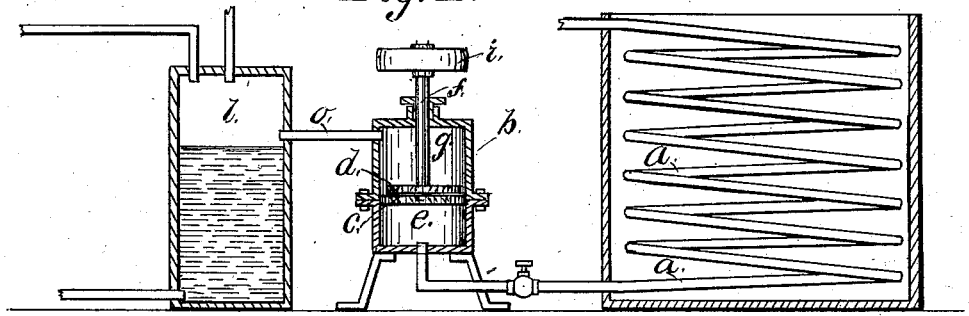

Figure 1 is an elevation, the refrigerator, the absorber, and the motor-case being shown in section.

A represents the system of pipes through which the gaseous ammonia passes in the refrigerator.

Figure 2:
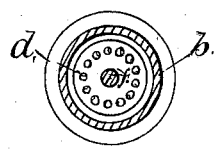

$b$ represents a motor which we use to illustrate our invention; but any other well-known motor may be substituted therefor if adapted to be driven by vapor or gas. The motor here shown consists of two disks, $c\ d$, each provided with a concentric ring of holes. (See Fig. 2, which is a plan of the motor.) Said holes are an equal distance apart and correspond in the two disks. They are not, however, in the same vertical line, but are oppositely inclined to each other in the line of their path of rotation, after the manner of a well-known instrument for illustrating experiments in acoustics, called a "siren." Disk $c$ forms the top of a closed chamber, $e$, into which the gaseous ammonia passes from the refrigerator. Disk $d$ has the upright shaft $f$ centrally secured therein, the lower end of which revolves in a step or bearing in disk $c$, their position being such that the disks are very close together, but not quite touching each other. $g$ is a closed chamber, bolted securely to and above chamber $e$, having a stuffing-gland at the top, through which shaft $f$ passes.

The operation of our device is as follows: The gaseous ammonia is admitted to the refrigerator-pipes at a certain pressure, and in passing through the pipes this pressure is increased by the expansion of the gas by the heat absorbed from the surrounding atmosphere or other medium in the refrigerator. The gas on leaving the refrigerator is conducted to the chamber $e$, and passing upward through the stationary disk $c$ strikes the oppositely-inclined openings in disk $d$ and causes it to rotate, carrying the driving-wheel $i$, from which motion is conveyed to a pump or other machinery by a belt. A pipe, $o$, connects chamber $g$ with the absorber $l$, containing water or weak aqua-ammonia, by which the ammonia-gas is absorbed, and a partial vacuum or low pressure is thereby maintained in chamber $g$. The heat absorbed from the medium in the refrigerator is thus converted into motion for useful purposes.

We claim as our invention—

In an ammonia refrigerating apparatus, the combination therewith of a motor driven by the ammonia-gas discharged from the refrigerator and exhausting into the absorber, substantially as described.

THOMAS DAVIS.
      CHAS. E. DAVIS.

Witnesses:
 H. P. HOOD,
 OZNI P. HOOD.